No. 811,969.  
PATENTED FEB. 6, 1906.  
A. P. SWAN.  
APPARATUS FOR PURIFYING AIR.  
APPLICATION FILED DEC. 17, 1904.  
3 SHEETS—SHEET 1.

No. 811,969. PATENTED FEB. 6, 1906.
A. P. SWAN.
APPARATUS FOR PURIFYING AIR.
APPLICATION FILED DEC. 17, 1904.

3 SHEETS—SHEET 2.

No. 811,969. PATENTED FEB. 6, 1906.
A. P. SWAN.
APPARATUS FOR PURIFYING AIR.
APPLICATION FILED DEC. 17, 1904.

3 SHEETS—SHEET 3.

Witnesses
R. R. Bond
E. N. Bond

Inventor
Allan P. Swan
by Djedesheim & Fairbank
Attorneys

UNITED STATES PATENT OFFICE.

ALLAN PETER SWAN, OF DUNDALK, IRELAND.

APPARATUS FOR PURIFYING AIR.

No. 811,969.

Specification of Letters Patent.

Patented Feb. 6, 1906.

Application filed December 17, 1904. Serial No. 237,303.

*To all whom it may concern:*

Be it known that I, ALLAN PETER SWAN, distiller, a subject of the King of Great Britain, residing at Redbarns, Dundalk, in the county of Louth, Ireland, have invented certain new and useful Improvements in Apparatus for Purifying Air, of which the following is a specification.

This invention relates to a process and apparatus for effecting the purification of air or gaseous media by the separation of the suspended matter or impurities—dust, bacterial spores, and the like—therefrom, the invention being applicable for use in purifying air on a large scale and being particularly, though not exclusively, intended for employment in the separation of the spores of bacteria and other ferments.

According to my invention I effect the process of purification by means of a viscous liquid or substance which is caused to adhere to the surfaces of small balls or spherical bodies formed of porcelain or other suitable material, the said balls being contained in a closed vessel through which air or other media to be purified is mechanically forced or drawn. By these means the matter held in suspension in the gaseous medium under treatment is arrested and the air rendered in a pure condition.

The device may be employed by itself or in conjunction with other purifying means, such as hair, wool, cotton, or the like.

In order that the said invention may be clearly understood and readily carried into effect, I will now proceed to describe the same more fully with reference to the example illustrated in the accompanying drawings, in which—

Figure 1:
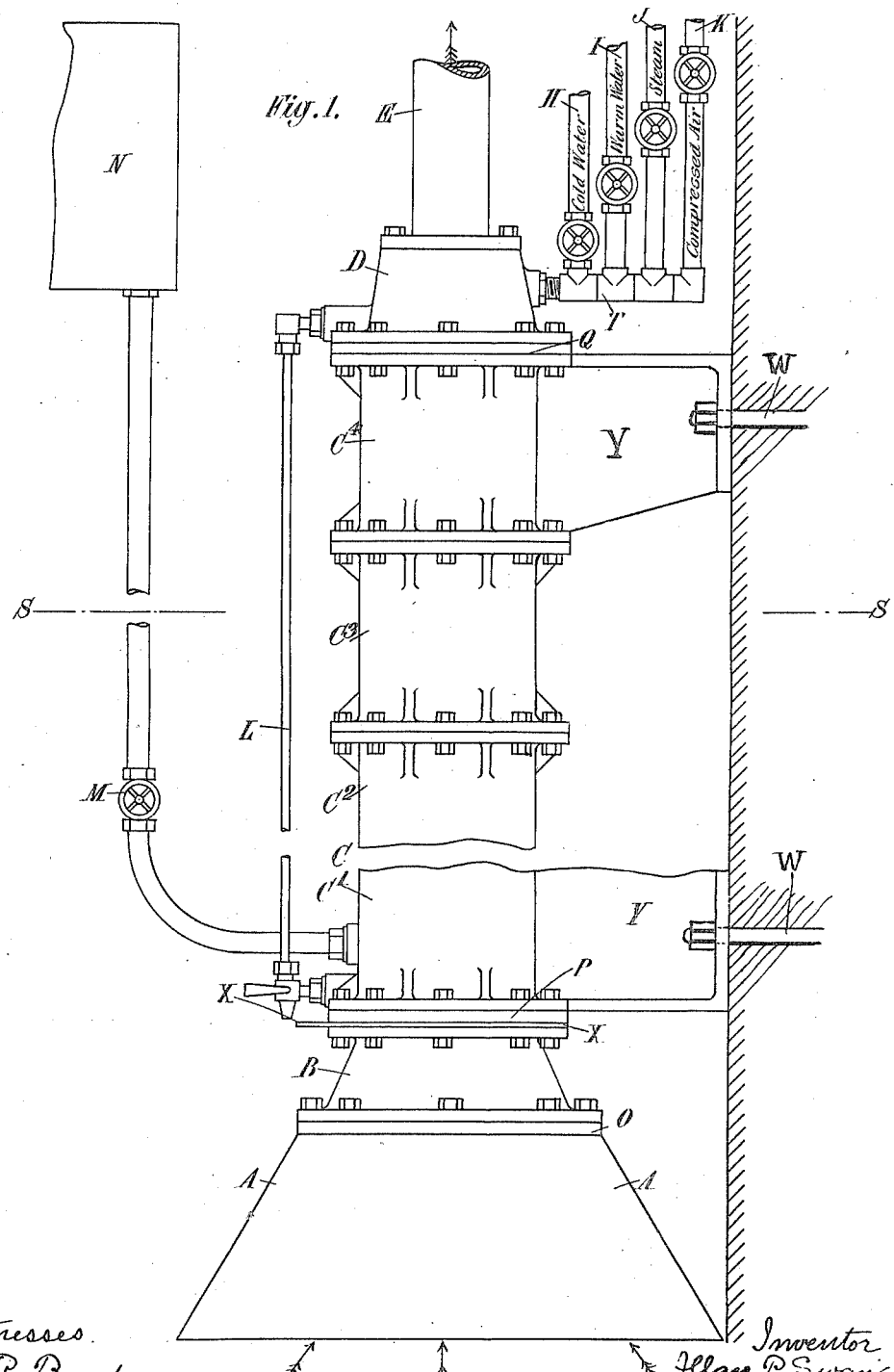
Figure 2:
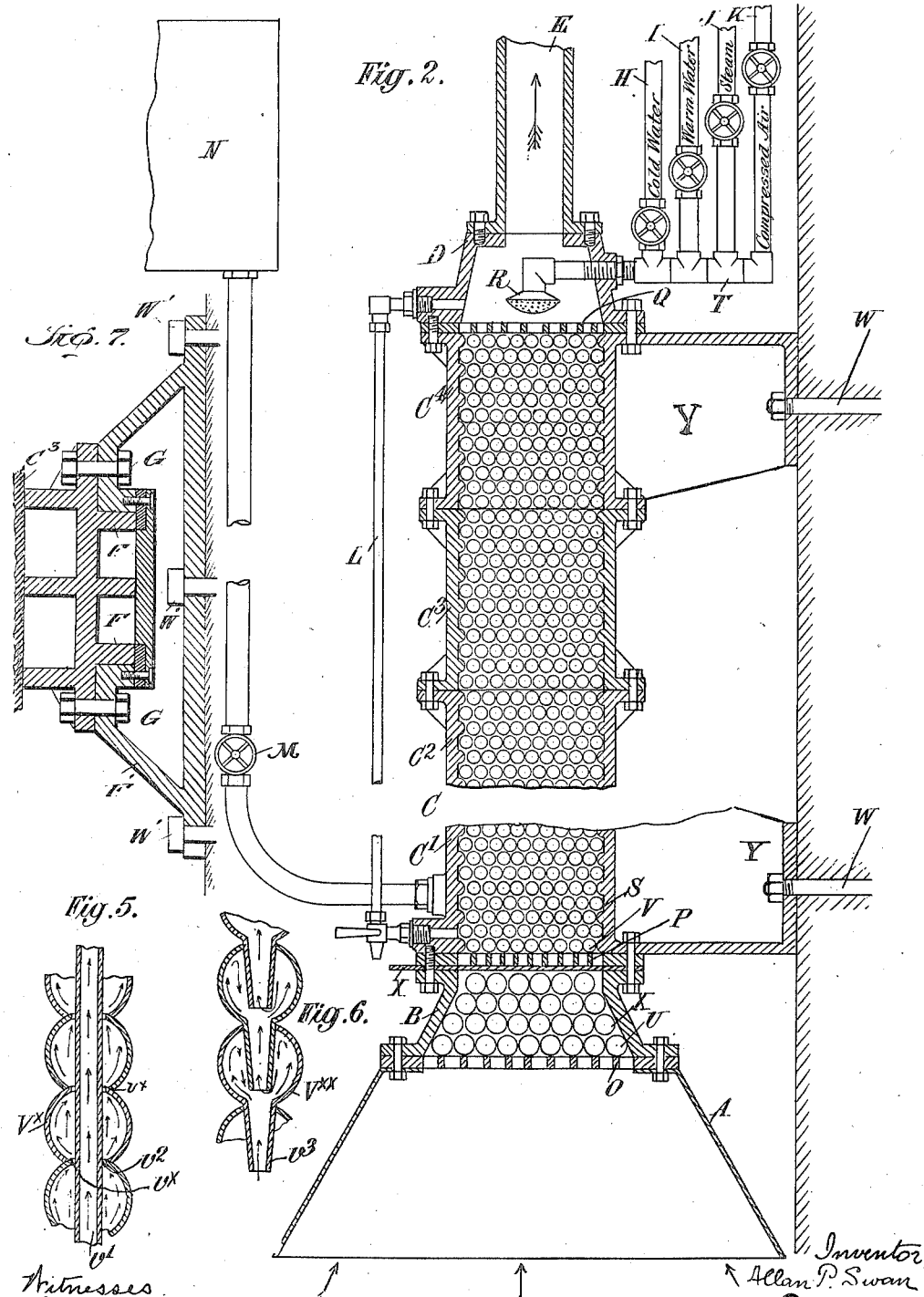
Figure 3:
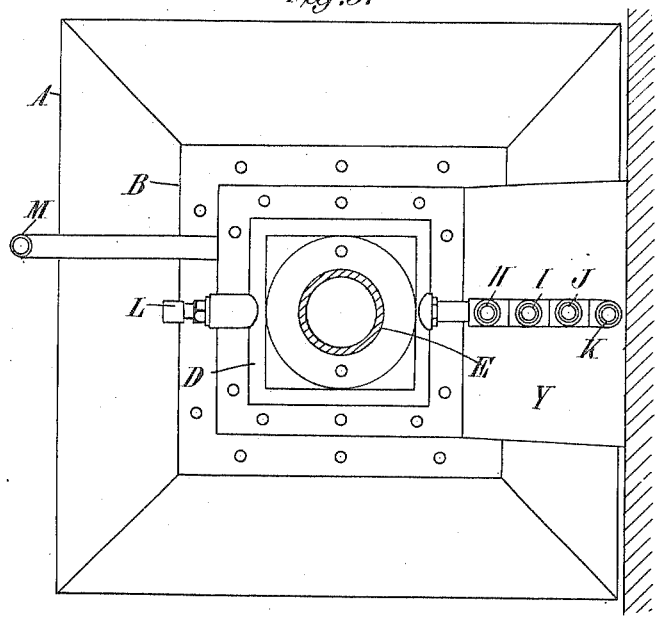
Figure 4:
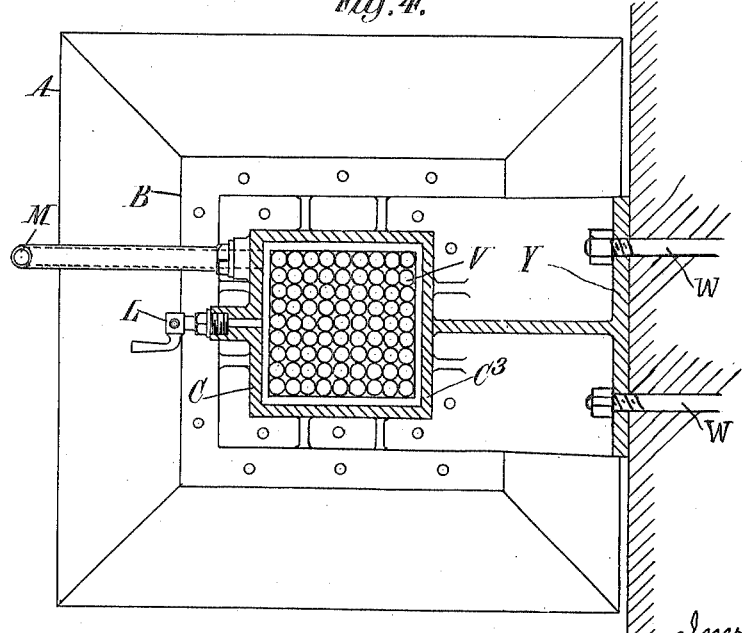

Figures 1 and 2 are respectively a side elevation and a vertical section of the apparatus. In these figures two methods of securing the apparatus to a wall are shown, the full lines representing wall-brackets cast in one with the end sections of the vessel and the dot-and-dash lines representing a trunnioned bracket. Fig. 3 is a plan corresponding with Fig. 1. Fig. 4 is a horizontal section taken along the line S S in Fig. 1. Figs. 5 and 6 are views in section illustrating modified forms of balls or obstacles. Fig. 7 is a vertical detail of a modification.

Apparatus adapted for carrying my invention into effect may comprise a frame A, preferably of cast-iron, to which is attached a conical or taper piece B, containing balls or spherical bodies U and above which is disposed the chamber C for containing the balls or spherical bodies V, the said chamber being preferably formed in sections $C'$ $C^2$ $C^3$, &c., bolted together through adjoining flanges on the several sections. The upper end of the chamber or of the uppermost section constituting the chamber is surmounted by a conical or dome-shaped cover or cap D, from which extends a pipe E and into which the pipes H I J K for the admission, respectively, of cold water, warm water, steam, compressed air lead by way of the pipe T, the latter being furnished with a rose or distributing appliance R. A gage-glass L extends between the dome D and the lowermost chamber $C'$ and serves to indicate the level in the chamber of the viscous liquid, which is admitted thereto by way of the valve-controlled supply-pipe M from the tank or container N. The balls or spherical bodies U V are supported by and confined between gratings or perforated plates O P Q, the balls U contained in the taper piece B being preferably of larger dimensions than those in the chamber C for the reasons hereinafter stated. X is a plate which is inserted below the grating P while charging the chamber with viscous liquid and adapted to prevent egress of the said liquid. In some instances this plate may be situated below the grating O. The several sections forming the chamber C are bolted together at their flanges, and the chamber may be secured to the wall by bolts W, passing through an ordinary wall-bracket Y. According to an alternative method (illustrated in Fig. 7) the said chamber may be connected by bolts G with a trunnion F, whereby the same may be revolved, the whole being carried by a bracket $F'$, attached to the wall by means of bolts $W'$.

In employing the apparatus for the purification of air, for example, the frame A is furnished with a covering of coarse flannel, and the balls or spherical bodies U V in the taper piece and chamber C, respectively, are covered with the viscous or adhesive liquid supplied from the tank or container N, the plate X being removed or withdrawn, so as to render free the passage through the grating. The air to be purified is drawn through the chamber C by means of an air-pump or of a fan, (not shown,) but which may be connected with the pipe E. The before-mentioned coarse flannel at the point of ingress of the said air has the effect of separating the coarser particles of suspended or floating matter, while the balls or spherical bodies U intercept the greater portion of the remaining dust in a finer state of division. The balls V in the chamber C arrest and retain the microscopic spores or the like which escape the other purifying media. The purified air is drawn through the pipe E and may be conveyed thence where required. It is evident that the air may be forced instead of drawn through the apparatus, if desired.

The cleansing of the balls and chamber may be effected by first admitting cold water by opening the valve on the pipe H, the water entering the chamber C above the grating Q and gravitating therethrough, having a certain cleansing effect upon the balls or spherical bodies. A further cleansing effect may be obtained by shutting off the cold-water supply and admitting warm water by opening the valve on the pipe I, while the thorough heating and sterilizing of the chamber and balls may be effected by admitting steam by opening the valve on the pipe J. The rotation of the chamber on the trunnion in a vertical plane is rendered possible by removing the bolts G and disconnecting the pipes H I J K M. The more thorough cleansing of the chamber and the contained bodies may be hereby effected either with the aid of hot water or other suitable solvent. The cleansing operation will, however, be easy or difficult of accomplishment according to the character of the viscous or adhesive liquid employed. The cleansing and sterilizing having been effected and the apparatus restored to its normal working condition, the lower end of the chamber C is closed by means of the plate X, whereupon communication with the tank N is reëstablished and the valve M opened, the viscous liquid being thereby admitted to the chamber C, with the result that the balls become coated therewith. By means of the gage L the level of the said liquid may be regulated. When the desired level is attained, so that the balls are effectually covered, air under pressure is admitted by opening the valve K, the liquid being thereby forced back into the tank N. The valve M is then closed, the plate X drawn out, and the air to be purified admitted, as hereinbefore explained.

The tapered chamber formed by the taper piece B can be removed by unscrewing the flange-bolts. The balls U contained in this chamber usually being more thickly coated with impurities than those in the chambers C are preferably cleaned by hand, and the flannel which covers the frame B should be changed at the same time.

The chambers to contain the globular baffling and separating obstacles may be round or square, and their dimensions can be made to vary with the space available or the special duty to be performed. These chambers can be made of wood or metal; but for facility of observation glass would be preferable. In the example illustrated the chambers are of square transverse section, with a view to affording increased and favorable accommodation for the balls or spherical bodies.

The spherical obstacles may be constructed of glass, porcelain, metal, or wood. Solid balls have been found to answer well for general use, although hollow bells or bodies of glass or other material may be found serviceable in certain circumstances, the said hollow bodies being provided with orifices at top and bottom and held in position by hollow, square, or round glass rods, thereby affording economy in space by offering greatly-increased superficial area. Such a construction is illustrated in Fig. 5, in which $V^\times$ are the globular bodies and $v^\times$ the opening at the base of each for the entrance of the top of the body immediately beneath, the bodies so formed being threaded upon a rod $v'$. The said upper ends are formed in such a manner as to leave an aperture $v^2$ for the passage of the air to be purified.

According to the construction illustrated in Fig. 6 the bodies are formed with a tubular extension $v^3$, which enters the globular portion $V^{\times\times}$ of the body next below. The extensions $v^3$ thus assist in retaining the bodies in position.

The adhesive liquid with which the balls are coated in order to intercept and retain spores or impurities may be used in its full strength or be diluted to any convenient extent. For discontinuous working a semisolid gelatinous coating not easily evaporated and offering no special difficulty in cleansing is desirable. If of organic origin, it would need special antiseptic preparation to obviate liquefaction. Such a liquid if applied hot would coagulate on cooling and leave a suitable film on the exposed surfaces. Glycerin may be employed; but probably no special adhesive medium will be suitable alike for all duties, and the media may range through products of vegetable, animal, or mineral origin.

With a view to rendering the purifying operation continuous the chambers may be of suitable form and dimensions and rendered self-cleaning by providing a constant but slow flow therethrough of a highly-dilute liquid, which by its downward circulation would simultaneously arrest and convey away all the impurities, and if pure water in sufficient quantity was circulated over the entire surface of each ball or body and these were sufficient in number the same result could probably be obtained without the employment of liquid of an adhesive nature. Such a chamber could be used for purifying air by filling it with pure water and then forcing the air into the chamber in such a way as to utilize the full baffling effect of the spherical bodies contained therein, while by allowing the water to circulate by gravitation—i. e., in a contrary direction to that of the air—a self-cleaning effect would be obtained. As this method would probably require increased mechanical force it would, perhaps, not be as economical as the methods previously described.

What I claim, and desire to secure by Letters Patent of the United States, is—

1. In apparatus for purifying air the combination of a chamber adapted for the reception of a number of balls or spherical bodies, means for applying viscous liquid to the said bodies and means operative near the discharge end of the apparatus for effecting the cleansing of the said bodies.

2. In apparatus for purifying air, the combination of a chamber adapted for the reception of a number of balls, or spherical bodies, means for applying viscous liquid to the said bodies means operative near the discharge end of the apparatus for effecting the cleansing of the said bodies and means for conducting a current of air into and through said chamber and bodies.

3. In apparatus for purifying air, the combination of a chamber adapted for the reception of a number of balls or spherical bodies, means for applying viscous liquid to the said bodies and means operative near the discharge end of the apparatus for effecting the cleansing and the sterilizing of the said bodies.

4. In apparatus for purifying air, the combination of a chamber adapted for the reception of a number of balls or spherical bodies, means for supplying viscous liquid to the said chamber and serving the said bodies with a coating of such liquid, means operative near the discharge end of the apparatus for effecting the cleansing and the sterilizing of the said bodies and means for conducting a current of air into and through the said chamber and bodies.

5. In apparatus for purifying air, the combination of a chamber, balls or spherical bodies in the said chamber, a tank or container for viscous liquid, a pipe leading from the said tank to the chamber and a valve or diaphragm in said chamber, a conical or taper piece on the end of said chamber, a movable partition between the same and balls or spherical bodies in said conical or taper piece.

6. In apparatus for purifying air, the combination of a chamber, balls or spherical bodies in the said chamber, a tank or container for viscous liquid, a pipe leading from the said tank to the chamber, a valve or diaphragm in said chamber a conical or taper piece on the end of said chamber, a movable partition between the same and balls or spherical bodies in said conical or taper piece and means for effecting the cleansing of the balls or spherical bodies.

7. In apparatus for purifying air, the combination of a chamber, balls or spherical bodies in the said chamber, a tank or container for viscous liquid, a pipe leading from the said tank to the chamber, a valve or diaphragm in said chamber a conical or taper piece on the end of said chamber, a movable partition between the same and balls or spherical bodies in said conical or taper piece means for effecting the cleansing of the said balls or spherical bodies and means for effecting the sterilization of the said bodies.

8. In apparatus for purifying air, the combination of a chamber, balls or spherical bodies in the said chamber means for applying viscous liquid to the said bodies, and purifying media a conical or taper piece beneath said chamber, balls or spherical bodies in said conical or taper piece and a movable plate between said chamber and conical or taper piece.

9. In apparatus for purifying air, the combination of a chamber, adapted for the reception of a number of balls or spherical bodies means for applying viscous liquid to the said bodies, means operatively arranged at the discharge end of the apparatus for effecting the cleansing of the said bodies and means for rotating the said chamber.

10. In apparatus for purifying air, the combination of a chamber balls or spherical bodies in the said chamber, a tank, a pipe leading from the said tank to the chamber a conical or taper piece detachably secured to one end of said chamber, balls or spherical bodies in said conical or taper piece and a wall-bracket on said chamber.

11. In apparatus for purifying air, the combination of a chamber, balls or spherical bodies in the said chamber, a tank, a pipe leading from the said tank to the chamber a union on said pipe and a bracket on the said chamber a conical or taper piece detachably secured to one end of said chamber, balls or spherical bodies in said conical or taper piece.

12. In apparatus for purifying air, the combination of a chamber, balls or spherical bodies in the same chamber, a conical or taper piece on said chamber, balls or spherical bodies in said conical or taper piece, a movable plate interposed between the balls of the chamber and of the conical or taper piece means for applying viscous liquid to the said bodies and means for effecting the cleansing of the said bodies.

13. In apparatus for purifying air, the combination of a chamber, balls or spherical bodies in the said chamber, a conical or taper piece on the said chamber, balls or spherical bodies in the said conical or taper piece, means for shutting off the chamber from the said taper piece, means for applying viscous liquid to the said bodies and means for effecting the cleansing of the said bodies.

14. In apparatus for purifying air, the combination of a chamber, balls or spherical bodies in the said chamber, a conical or taper piece on the said chamber, balls or spherical bodies in the said taper piece, means for shutting off the said chamber from the said taper piece, a frame, a covering of coarse flannel on the said frame, means for applying viscous liquid to the said bodies and means for effecting the cleansing of the said bodies.

15. In apparatus for purifying air, the combination of a chamber, balls or spherical bodies in the said chamber, a grid or grating at the lower end of the said chamber, a conical or taper piece on the said chamber, balls or spherical bodies in the said taper piece, a grid or grating at the lower end of the said taper piece, a means for shutting off the said chamber from the said taper piece, a frame, a covering of coarse flannel on the said frame, means for applying a viscous liquid to the said bodies and means for effecting the cleansing of the said bodies.

16. In apparatus for purifying air, the combination of a chamber, balls or spherical bodies in the said chamber, a conical or dome shaped cover or cap a distributing appliance service-pipes to the said appliance for cold water, warm water, steam and compressed air, a grid or grating at the lower end of the said chamber, a conical or taper piece on the said chamber, balls or spherical bodies in the said taper piece, a grid or grating at the lower end of the said taper piece, means for shutting off the said chamber from the said taper piece, a frame, a coarse flannel covering to the said frame, and means for applying viscous liquid to the said bodies.

17. In apparatus for purifying air, the combination of a chamber, balls or spherical bodies in the said chamber, a conical or dome shaped cover or cap a grid or grating at the lower end of the said cover or cap, a distributing appliance, service-pipes to the said appliance for cold water, warm water, steam, compressed air, a grid or grating at the lower end of the said chamber, a conical or taper piece on the said chamber, balls or spherical bodies in the said taper piece, a grid or grating at the lower end of the said taper piece, means for shutting off the said chamber from the said taper piece, a frame, a coarse flannel to the said frame and means for applying viscous liquid to the said bodies.

18. In apparatus for purifying air, the combination of a chamber having balls or spherical bodies of hollow formation and means for holding the said bodies in position relatively in the said chamber, means for applying viscous liquid to the said bodies and means for effecting the cleansing of the said bodies.

19. In apparatus for purifying air, the combination of a chamber having therein balls or spherical bodies of hollow formation and means for holding the said bodies in position relatively in the said chamber, means for applying viscous liquid to the said bodies, means for effecting the cleansing of the said bodies and means for effecting the sterilization of the said bodies.

20. In apparatus for purifying air, the combination of a chamber and a conical piece thereon with balls or spherical bodies therein, means for applying viscous liquid to the said bodies and means for effecting the cleansing of said bodies.

In testimony whereof I have hereunto set my hand, in presence of two subscribing witnesses, this 20th day of November, 1904.

ALLAN PETER SWAN.

Witnesses:
T. SELBY WARDLE,
R. SMITH.